(12) United States Patent
Wang et al.

(10) Patent No.: US 7,454,428 B2
(45) Date of Patent: Nov. 18, 2008

(54) NETWORK DATA MODEL FOR RELATIONAL DATABASE MANAGEMENT SYSTEM

(75) Inventors: Cheng-Hua Wang, Bedford, NH (US); Siva Ravada, Nashua, NH (US)

(73) Assignee: Oracle International Corp., Redwood Shores, CA (US)

( * ) Notice: Subject to any disclaimer, the term of this patent is extended or adjusted under 35 U.S.C. 154(b) by 476 days.

(21) Appl. No.: 10/696,482

(22) Filed: Oct. 29, 2003

(65) Prior Publication Data

US 2005/0097108 A1    May 5, 2005

(51) Int. Cl.
   *G06F 17/00*    (2006.01)
(52) U.S. Cl. ...................................... 707/100
(58) Field of Classification Search ......... 707/100–102, 707/1–3; 370/395.31, 254, 238, 238.1
   See application file for complete search history.

(56) References Cited

U.S. PATENT DOCUMENTS

| | | | |
|---|---|---|---|
| 6,631,136 B1* | 10/2003 | Chowdhury et al. ... | 370/395.31 |
| 6,633,886 B1* | 10/2003 | Chong .................. | 707/102 |
| 6,711,563 B1* | 3/2004 | Koskas ............... | 707/3 |
| 6,714,936 B1* | 3/2004 | Nevin, III ............ | 707/102 |
| 6,917,943 B2* | 7/2005 | Butler ................. | 707/100 |
| 2003/0221162 A1* | 11/2003 | Sridhar ............... | 715/501.1 |
| 2004/0042405 A1* | 3/2004 | Nesbitt ............... | 370/238 |
| 2004/0246892 A1* | 12/2004 | Elie-Dit-Cosaque et al. ............... | 370/216 |

OTHER PUBLICATIONS

Environmental Systems Research Institute, Inc., NetEngine—A Programmer's Library for Network Analysis, http://www.esri.com(2003) U.S.A. h.

Algorithmic Solutions Software GmbH, The LEDA User Manual, 2003, pp. i-vii and 251-282, http://www.algorithmic-solutions.com (Germany).

* cited by examiner

*Primary Examiner*—Wilson Lee

(57) ABSTRACT

A shareable application program interface (API) and network data model infrastructure which is used in combination with a relational database to provide data storage and processing functions for network data. The network data model is stored in relational tables that describe a set of nodes and links forming a network wherein each node represents an object of interest and each link represents a relationship between two nodes. A generic node table contains a row describing each node in the network, and a generic link table contains row data describing each link. In addition, a path table whose contents are commonly generated by network analysis procedures contains rows which describe corresponding paths each consisting of an alternating sequence of nodes and links. The sequence of links in each path are identified in a separate path-link table. The system provides two application program interfaces, a PL/SQL API and a Java API, which permit executing application programs to use stored procedures for creating the node and link tables, store data describing nodes and links in the tables, and perform standard operations on the network data.

16 Claims, 3 Drawing Sheets

| Path-Link Table | | |
|---|---|---|
| Path_ID | Link_ID | SEQ_NO |
| 1 | 2 | 1 |
| 1 | 3 | 2 |

| Node Table | | | | | | | |
|---|---|---|---|---|---|---|---|
| ID | Name | Type | Active | Geometry | Cost | Level | Parent |
| 1 | N1 | | Y | | 2 | | |
| 2 | N2 | | Y | | 3 | | |
| 3 | N3 | | Y | | 2 | | |

| Link Table | | | | | | | | | |
|---|---|---|---|---|---|---|---|---|---|
| ID | Name | Start | End | Type | Active | Level | Geometry | Cost | Parent |
| 1 | L1 | 1 | 2 | | Y | | | 10 | |
| 2 | L2 | 2 | 3 | | Y | | | 7 | |
| 3 | L3 | 3 | 1 | | Y | | | 8 | |

| Path Table | | | | | | | |
|---|---|---|---|---|---|---|---|
| ID | Name | Start | End | Type | Cost | Simple | Geometry |
| 1 | P1 | 2 | 1 | | 15 | Y | |

NETWORK DATA MODEL FOR RELATIONAL DATABASE MANAGEMENT SYSTEM

FIELD OF THE INVENTION

This invention relates to electronic data processing systems, and more particularly to systems for modeling and analyzing relationships between objects.

BACKGROUND OF THE INVENTION

It is often desirable to model and analyze relationships among objects of interest. A network (or a graph) is one of such modeling representations. There are three elements in a network representation: nodes, links, and paths. The objects of interest are called nodes and the relationships between nodes are called links. A path is an ordered list of links and typically with no repeating nodes or links. Only connectivity information is needed for modeling a network. In addition, the concept of cost (or weight) may be introduced in links and nodes if cost needs to be taken into account during the analysis.

Software products have been developed for performing network analysis. Two popular products are NetEngine™ and the LEDA™ library. NetEngine is primarily used for geographic applications while the LEDA™ library is for general graph/network problems.

NetEngine™ provides a program library designed for geographic network analysis and provides the capability to define, store, traverse, and analyze many kinds of networks through a C application program interface (API) or through a Visual Basic® type library. NetEngine™ is delivered with a set of network analysis algorithms including determining the shortest path between two or more points, solving the traveling salesman problem, identifying the "closest" object meeting a stated criteria, computing origin-destination distance matrices, and allocating service areas to a location. NetEngine™ employs in-memory data structures and methods, and stores each network topology to a permanent disk file. NetEngine™ is available from ESRI, 380 New York Street, Redlands, Calif. (http://www.esri.com).

LEDA™, an acronym for "Library of Efficient Data types and Algorithms," is implemented by a C++ class library available from Algorithmic Solutions Software GmbH, Saarbrücken, Germany (http://www.algorithmic-solutions.com). The LEDA™ library provides standard graph data types and a wide variety of graph and network algorithms like depth-first search, breadth-first search, shortest paths, minimal spanning trees, matching, weighted matching, network flow, planarity testing, and graph layout.

Available software products present several difficulties. They typically employ proprietary file formats so that network data and the results of network analysis are difficult to exchange, share, and manage. Network information is not separated from applications and requires customized solutions and is accompanied by high maintenance costs. The available data structures and algorithms can incur performance and data management problems when used with the large data sets often present in spatial applications.

SUMMARY OF THE INVENTION

The present invention provides an open, persistent, generic network data model which is implemented using a relational database management system (RDBMS), providing query and management functions using SQL, and simplifying data management and enforcing referential integrity. The network data model contemplated by the invention cleanly separates application information from network information and provides a general approach to network applications that eliminates high maintenance costs associated with proprietary data structures. By integrating network data types and network analysis with a relational database management system, the advantages of the RDBMS, including scalability, manageability, security, and currency, are made available to network data and analysis applications. In addition, the preferred embodiment of the invention is directly integrated with existing geometric data structures and procedures to provide spatial information management.

The open and generic network data model for network applications stores network information in database tables. Standard database SQL queries and PL/SQL functions and procedures can be performed on the network data in the tables. Only generic connectivity information need be captured in the network data model, thus providing a clean separation between connectivity and application information. Network information may be stored and managed using the PL/SQL interface in the relational database, and network representation, network loading, and network analysis may be performed by client applications using a provided Java API.

The preferred embodiment of the invention takes the form of an extension to relational database management system for storing and analyzing network data. The network data is stored in relational tables that describe a set of nodes and links forming a network wherein each node represents an object of interest and each link represents a relationship between two of the nodes.

The network data model includes a generic node table that contains a plurality of node table rows, each of which contains data describing a given node in the network, and a generic link table containing a plurality of link table rows, each of which contains data describing a link between two nodes in the network.

The network data model further provides application both PL/SQL and Java program interfaces which enable executing application programs to create the node and link tables, to store additional data describing each node and link in the node and link tables, and to perform a plurality of standard operations on the data in the node and link tables.

The network described by the data model may be a logical network specifying the linked connectivity between nodes and further specifying node and link cost values, enabling network analysis to be conducted to find, for example, a particular path having stated a cost characteristics, such as the minimum total cost from a stated start node to a stated end node.

Analysis functions may produce results by populating path and path link tables which specify one or more paths consisting of an alternating sequence of nodes and links having defined characteristics. The each path may be defined by a path-link table containing an ordered set of path-link table rows containing information identifying one link in the sequence of links in said given path.

The data model further permits the storage of user-defined data in the network data model tables, including a standard object data type for defining the geometry of nodes, links, and paths. A network metadata table stores additional information about the network.

The network data model may be hierarchical. Each node table row a column for holding a hierarchy level and a further column for holding the identification of a parent node within the hierarchy established by the level column.

These and other features and advantages of the present invention may be better understood by considering the following detailed description of a preferred embodiment of the invention.

BRIEF DESCRIPTION OF THE DRAWINGS

In the detailed description which follows, frequent reference will be made to the attached drawings, in which.

DETAILED DESCRIPTION

Figures 1, 2, 3, 4, 5:
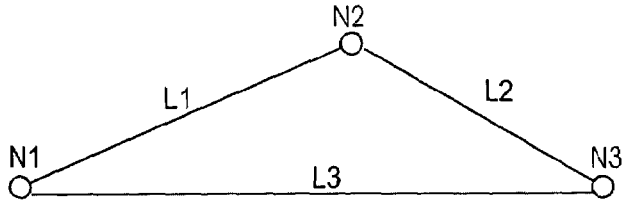
FIG. 1 illustrates a simple logical network which is described using the tables shown in FIGS. 2-5.
FIG. 2 illustrates the makeup of a node table.
FIG. 3 illustrates a link table.
FIG. 4 illustrates a path table.
FIG. 5 shows a path-link table.

The preferred embodiment described below provides methods and apparatus for modeling a set of nodes and links that together form a network. Each node represents an object of interest and each link represents a relationship between two nodes. Network analysis procedures provided by the data model often produce result data which defines a specific path, an alternating sequence of nodes and links, beginning and ending with nodes, and typically with no nodes and links appearing more than once.

The preferred network modeling system embodying the invention forms a part of and extends the functionality of a relational database management system (RDBMS). More specifically, the preferred network modeling system to be described is implemented as an extension to an Oracle 10$^g$ database employing Oracle Spatial, an integrated set of functions and procedures that enables spatial data to be stored, accessed, and analyzed quickly and efficiently. Oracle Spatial is described in detail in the *Oracle Spatial User's Guide and Reference*, Release 9.2, March 2002, Part No. A96630-01, which provides usage and reference information for indexing and storing spatial data and for developing spatial applications using Oracle Spatial. Oracle Spatial requires Oracle10$^g$ Enterprise Edition RDBMS and provides a foundation for the deployment of enterprise-wide spatial information systems, and Web-based and wireless location-based applications requiring complex spatial data management. Oracle Spatial, and the Oracle10$^g$ Enterprise Edition database relational database management system (RDBMS) product with which it works, are available from Oracle Corporation, Redwood Shores, Calif. Oracle Spatial provides a standard data type for defining spatial geometries, as well a variety of standard procedures for manipulating geometry data, which are used to advantage in connection with the present invention. Pertinent features of Oracle Spatial and the geometry data type SDO_GEOMETRY which it defines are fully described in detail in the above-noted *Oracle Spatial User's Guide and Reference* and are summarized briefly below.

The present invention provides a shareable application program interface (API) and network data model infrastructure which is used in combination with a relational database, such as the Oracle9i Enterprise Edition with Oracle Spatial, to provide a consistent data model and processing functions for network data.

Introduction to Network Modeling

In many applications, capabilities or objects are modeled as nodes and links in a network. The network model contains logical information such as connectivity relationships among nodes and links, directions of links, and costs of nodes and links. With logical network information, the user can analyze a network and answer questions, many of them related to path computing and tracing. For example, for a biochemical pathway, the user can find all possible reaction paths between two chemical compounds. For a road network, the user can find the shortest (distance) or fastest (travel time) path between two cities, or the closest hotel to a specific airport.

In additional to logical network information, spatial information such as node locations and link geometries can be associated with the logical network. This information can help the user to model the logical information (such as the cost of a route, because its physical length can be directly computed from its spatial representation).

The generic data model and network analysis capability provided by the present invention can model and analyze many kinds of network applications in addition to traditional geographical information systems (GIS). For example, in biochemistry, applications may need to model reaction pathway networks for living organisms; and in the pharmaceutical industry, applications to model the drug discovery process may need to model protein-protein interaction.

The network modeling capabilities provided by the present invention include schema objects and an application programming interface (API). The schema objects include metadata and network tables. The API includes a server-side PL/SQL API for creating, managing, and analyzing networks in the database, and a middle-tier (or client-side) Java API for network analysis.

There are two basic approaches to creating a network data model: the user can request the system to perform most operations, using standard stored procedures, or the user can perform the operations by creating the necessary network tables and updating the network metadata. With each approach, the user must insert the network data into the network tables. Optionally the user can create an in-memory network object using the Java application programming interfaces (API) and save it to the database. The user may then use the network data model PL/SQL and Java application programming interfaces (APIs) to update the network and perform other operations.

Network Data Model Concepts and Definitions

A network is a type of mathematical graph that captures relationships between objects using connectivity. The connectivity may or may not be based on spatial proximity. For example, if two towns are on opposite sides of a lake, the shortest path based on spatial proximity (a straight line across the middle of the lake) is not relevant if the user wants to drive from one town to the other. Instead, to find the shortest driving distance, the user needs connectivity information about roads and intersections and about the "cost" of individual links.

A network consists of a set of nodes and links. Each link (sometimes also called an edge or a segment) specifies two nodes. A network can be directed or undirected, although links and paths typically have direction.

In describing the preferred network data model embodying the invention, it will be useful to first define some key terms used in this specification to describe the network data model. Unless otherwise apparent from the context, each of the following terms have the following meanings:

A "node" represents an object of interest.

A "link" represents a relationship between two nodes. A link may be directed (that is, have a direction) or undirected (that is, not have a direction).

A "path" is an alternating sequence of nodes and links, beginning and ending with nodes, and typically with no nodes and links appearing more than once.

A "network" contains a set of nodes and links. A network is directed if the links that is contains are directed, and a network is undirected if the links that it contains are undirected.

A "logical network" contains connectivity information but no geometric information. This is the model used for network analysis. A logical network can be treated as a directed graph or undirected graph, depending on the application.

A "spatial network" contains both connectivity information and geometric information.

A "feature" is an object of interest in a network application that is associated with a node or link. For example, in a transportation network, features include exits and intersections (mapped to nodes), and highways and streets (mapped to links).

"Cost" is a non-negative numeric attribute that can be associated with links or nodes for computing such things as the minimum cost path (the path that has the minimum total cost from a start node to an end node). The user can specify a single cost factor, such as driving time or driving distance for links, in the network metadata.

"Reachable nodes" are all nodes that can be reached from a given node. Reaching nodes are all nodes that can reach a given node.

The "degree" of a node is the number of links to (that is, incident upon) the node. The in-degree is the number of inbound links, and the out-degree is the number of outbound links.

"Network constraints" are restrictions defined on network analysis computations (for example, that driving routes must consist of expressways and major highways).

A "spanning tree" of a connected graph is a tree (that is, a graph with no cycles) that connects all nodes of the graph. (The directions of links are ignored in a spanning tree.)

A "minimum cost spanning tree" is the spanning tree that connects all nodes and has the minimum total cost.

Network Applications

Networks are used in applications to find how different objects are connected to each other. The connectivity is often expressed in terms of adjacency and path relationships. Two nodes are adjacent if they are connected by a link. There are often several paths between any two given nodes, and the user may want to find the path with the minimum cost. This section describes some typical examples of different kinds of network applications.

Road Network Example. In a typical road network, the intersections of roads are nodes and the road segments between two intersections are links. The spatial representation of a road is not inherently related to the nodes and links in the network. For example, a shape point in the spatial representation of a road (reflecting a sharp turn in the road) is not a node in the network if that shape point is not associated with an intersection; and a single spatial object may make up several links in a network (such as a straight segment intersected by three crossing roads). An important operation with a road network is to find the path from a start point to an end point, minimizing either the travel time or distance. There may be additional constraints on the path computation, such as having the path go through a particular landmark or avoid a particular intersection.

Train (Subway) Network Example. The subway network of any major city can be modeled as a logical network, assuming that precise spatial representation of the stops and track lines is unimportant. In such a network, all stops on the system constitute the nodes of the network, and a link is the connection between two stops if a train travels directly between these two stops. Important operations with a train network include finding all stations that can be reached from a specified station, finding the number of stops between two specified stations, and finding the travel time between two stations.

Utility Network Example. Utility networks, such as power line or cable networks, must often be configured to minimize the cost. An important operation with a utility network is to determine the connections among nodes, using minimum cost spanning tree algorithms, to provide the required quality of service at the minimum cost. Another important operation is reachability analysis, so that, for example, if a station in a water network is shut down, the user knows which areas will be affected.

Biochemical Network Example. Biochemical processes can be modeled as biochemical networks to represent reactions and regulations in living organisms. For example, metabolic pathways are networks involved in enzymatic reactions, while regulatory pathways represent protein-protein interactions. In this example, a pathway is a network; genes, proteins, and chemical compounds are nodes; and reactions among nodes are links. Important operations for a biochemical network include computing paths and the degrees of nodes.

Network Data Model Tables

The present invention may be used to store and analyze data describing a network. A simple logical network is shown in FIG. 1 consisting of three nodes designated by Node ID values 1, 2 and 3 and by node Name values "N1", "N2" and "N3" respectively. The connectivity information for the network of FIG. 1 is stored in two tables: a node table and a link table, illustrated in simplified form in FIGS. 2 and 3 respectively. In addition, path information can be stored in a path table shown illustrated in FIG. 4 and a path-link table illustrated in FIG. 5. As shown in FIGS. 1 and 3, the link named "L1" is a directed straight line connecting nodes N1 and N2, link "L2" is a directed straight line connecting nodes N2 and N3, and link "L3" is a straight line connecting nodes N3 and N1. There are no other nodes on any of the links.

The user may request the system to create these tables automatically when creating the network using a standard procedure (named "CREATE_<network-type>_NETWORK") which is available via the PL/SQL interface, or the user can create these tables using individual node table, link table, path table and path-link table creation procedures also provided by the PL/SQL interface. The tables can also be created using create elements methods provided by the NetworkFactory class of the Java API.

These tables contain columns with predefined names, and the user must not change any of the predefined column names (which will be referenced by standard procedures); however, the user can add columns to the tables by using an ALTER TABLE PL/SQL statement with the ADD COLUMN clause. For example, although each link and path table is created with a single COST column, the user can create additional columns and associate them with other comparable attributes. For example, if the user wanted to assign a driving time, scenic appeal rating, and a danger rating to each link, the user could use the COST column for driving time, add columns for SCENIC_APPEAL and DANGER to the link table, and populate all three columns with values to be interpreted by applications. Because the connectivity data used by the network data model are stored as standard RDBMS tables, the data may be manipulated using the robust capabilities of the database system, including a rich set of standard PL/SQL procedures as described, for example in *Oracle9i: The Complete Reference* by Loney and Koch, McGraw-Hill Osborne Media; Book and CD edition ISBN: 0072225211 (Aug. 16, 2002).

The example statements below call the SDO_NET.CREATE_LOGICAL_NETWORK procedure, which does the following: creates the LOG_NET1 directed network; creates the LOG_NET1_NODE$, LOG_NET1_LINK$, LOG_NET1_PATH$, and LOG_NET1_PLINK$ tables; and updates the xxx_SDO_NETWORK_METADATA views. Both the node and link tables contain a cost column named COST. (Because this is a logical network, there are no geometry columns.) The example also populates the node and link tables.

Simple Logical Network Example (PL/SQL)

The following statement creates a directed logical network named LOG_NET 1, and creates tables named LOG_NET1_NODE$, LOG_NET1_LINK $, LOG_NET1_PATH$, and LOG_NET1_PLINK$ tables. The statement further updates USER_SDO_NETWORK_METADATA. Both the node and link tables contain a cost column named COST.

EXECUTE SDO_NET.CREATE_LOGICAL_NETWORK('LOG_NET1', 1, TRUE, TRUE);

The following statements populate the node table LOG_NET1_NODE$ with row data:

INSERT INTO log_net1_node$ (node_id, node_name, active, cost) VALUES (1, 'N1', 'Y', 2);

INSERT INTO log_net1_node$ (node_id, node_name, active, cost) VALUES (2, 'N2', 'Y', 3);

INSERT INTO log_net1_inode$ (node_id, node_name, active, cost) VALUES (3, 'N3', 'Y', 2);

The populated node table is shown in FIG. 2. Because the network pictured in FIG. 1 is a logical network, the nodes do not have geometries and the Geometry column shown is not used. In a spatial network, SDO_GEOMETRY objects would be placed in the Geometry column to specify the geometry of the node.

Next, the following statements populate the link table LOG_NET_LINK$:

INSERT INTO log_net1_link$ (link_id, link_name, start_node_id, end_node_id, active, link_level, cost) VALUES (1, 'L1', 1, 2, 'Y', 1, 10);

INSERT INTO log_net1_link$ (link_id, link_name, start_node_id, end_node_id, active, link_level, cost) VALUES (2, 'L2', 2, 3, 'Y', 1, 7);

INSERT INTO log_net1_link$ (link_id, link_name, start_node_id, end_node_id, active, link_level, cost) VALUES (3, 'L3', 3, 1, 'Y', 1, 8);

The path and path-link (LOG_NET1_PATH$ and LOG_NET1_PLINK$) tables are not initially populated, This typically occurs when a network analysis procedure executes to identify a particular path meeting a stated criteria. The details of the contents of the network data model tables are described next.

Node Table

Each network has a node table that can contain the columns set forth below:

| Column Name | Data Type | Description |
| --- | --- | --- |
| NODE_ID | NUMBER | ID number that uniquely identifies this node within the network. |
| NODE_NAME | VARCHAR2(32) | Name of the node. |
| NODE_TYPE | VARCHAR2(24) | User-defined string to identify the node type. |
| ACTIVE | VARCHAR2(1) | Contains Y if the node is active (visible in the network), or N if the node is not active. |
| PARTITION_ID | NUMBER | (Reserved for future use.) |
| <node_geometry column>, or GEOM_ID and MEASURE | SDO_GEOMETRY, or SDO_TOPO_GEOMETRY, or NUMBER | For a spatial (SDO, non-LRS) network, name of the SDO_GEOMETRY column containing the geometry objects associated with the node. For a spatial topology network, name of the SDO_TOPO_GEOMETRY column containing the topology geometry objects associated with the node. For a spatial LRS network, GEOM_ID and MEASURE columns (both of type NUMBER) for the geometry objects associated with the node. For a logical network, this column is not used. For a spatial SDO or topology network, the actual column name is either a default name or what the user specified as the geom_column parameter value in the call to the SDO_NET.CREATE_NODE_TABLE procedure. |

-continued

| Column Name | Data Type | Description |
|---|---|---|
| <node_cost_column> | NUMBER | Name of the column containing the cost value to be associated with the node, for use by applications that use the network. The actual column name is either a default name or what you specified as the cost column parameter value in the call to the SDO_NET.CREATE_NODE_TABLE procedure. The cost value can represent anything the user wants, for example, the toll to be paid at a toll booth. |
| HIERARCHY_LEVEL | NUMBER | For hierarchical networks only: number indicating the level in the network Hierarchy for this node. |
| PARENT_NODE_ID | NUMBER | For hierarchical networks only: node ID of the parent node of this node. |

A node table containing rows for the nodes of the simple logical network of FIG. 1 is shown in FIG. 2.

Link Table

Each network had a link table that contains the columns described below:

| Column Name | Data Type | Description |
|---|---|---|
| LINK_ID | NUMBER | ID number that uniquely identifies this link within the network. |
| LINK_NAME | VARCHAR2(32) | Name of the link. |
| START_NODE_ID | NUMBER | Node ID of the node that starts the link. |
| END_NODE_ID | NUMBER | Node ID of the node that ends the link. |
| LINK_TYPE | VARCHAR2(24) | User-defined string to identify the link type. |
| ACTIVE | VARCHAR2(1) | Contains Y if the link is active (visible in the network), or N if the link is not active. |
| LINK_LEVEL | NUMBER | Priority level for the link; used for hierarchical modeling, so that links with higher priority levels can be considered first in computing a path. |
| <link_geometry_column>; or GEOM_ID, START_MEASURE, and END_MEASURE | SDO_GEOMETRY, or SDO_TOPO_GEOMETRY, or NUMBER | For a spatial (SDO, non-LRS) network, name of the SDO_GEOMETRY column containing the geometry objects associated with the link. For a spatial topology network, name of the SDO_TOPO_GEOMETRY column containing the topology geometry objects associated with the link. For a spatial LRS network, GEOM_ID, START_MEASURE, and END_MEASURE columns (all of type NUMBER) for the geometry objects associated with the link. For a logical network, this column is not used. For a spatial SDO or topology network, the actual column name is either a default name or what the user specified as the geom_column parameter value in the call to the SDO_NET.CREATE_LINK_TABLE procedure. |
| <link_cost_column> | NUMBER | Name of the column containing the cost value to be associated with the link, for use by applications that use the network. The actual column name is either a default name or what you specified as the cost_column parameter value in the call to the SDO_NET.CREATE_LINK_TABLE procedure. The cost value can represent anything you want, for example, the estimated driving time for the link. |
| PARENT_LINK_ID | NUMBER | For hierarchical networks only: link ID of the parent link of this link. (Section 5.5 explains parent-child relationships in a network hierarchy.) |

Path Table

Each network can have a path table. A path is an ordered sequence of links, and is usually created as a result of network analysis. A path table provides a way to store the result of this analysis. For each path table, the analysis procedure, or the user, must create an associated path-link table, described below. Each path table contains the columns described below:

| Column Name | Data Type | Description |
| --- | --- | --- |
| PATH_ID | NUMBER | ID number that uniquely identifies this path within the network. |
| PATH_NAME | VARCHAR2(32) | Name of the path. |
| START_NODE_ID | NUMBER | Node ID of the node that starts the first link in the path. |
| END_NODE_ID | NUMBER | Node ID of the node that ends the last link in the path. |
| PATH_TYPE | VARCHAR2(24) | User-defined string to identify the path type. |
| COST | NUMBER | Cost value to be associated with the path, for use by applications that use the network. The cost value can represent anything the user wants, for example, the estimated driving time for the path. |
| SIMPLE | VARCHAR2(1) | Contains Y if the path is a simple path, or N if the path is a complex path. In a simple path, the links form an ordered list that can be traversed from the start node to the end node with each link visited once. In a complex path, there are multiple options for going from the start node to the end node. |
| <path_geometry_column> | SDO_GEOMETRY | For all network types except logical, name of the column containing the geometry object associated with the path. The actual column name is either a default name or what you specified as the geom_column parameter value in the call to the SDO_NET.CREATE_PATH_TABLE procedure. For a logical network, this column is not used. |

Path-Link Table

For each path table, the user must create a path-link table. Each row in the path-link table uniquely identifies a link within a path in a network. The order of rows in the path-link table is not significant. Each path-link table contains the columns described below:

| Column Name | Data Type | Description |
| --- | --- | --- |
| PATH_ID | NUMBER | ID number of the path in the network. |
| LINK_ID | NUMBER | ID number of the link in the network. Each combination of PATH_ID and LINK_ID must be unique within the network. |
| SEQ_NO | NUMBER | Sequence number of the link in the path. |

Network Hierarchy

Some network applications require representations at different levels of abstraction. For example, two major processes might be represented as nodes with a link between them at the highest level of abstraction, and each major process might have several subordinate processes that are represented as nodes and links at the next level down.

A network hierarchy allows the user to represent a network with multiple levels of abstraction by assigning a hierarchy level to each node. Links are not assigned a hierarchy level, and links can be between nodes in the same hierarchy level or in different levels. Links are, however, assigned priority levels so that links with higher priorities can be considered first in computing a path. The lowest (most detailed) level in the hierarchy is level 1, and successive higher levels are numbered 2, 3, and so on. Nodes at adjacent levels of a network hierarchy have parent-child relationships. Each node at the higher level can be the parent node for one or more nodes at the lower level. Each node at the lower level can be a child node of one node at the higher level. Links can also have parent-child relationships. However, because links are not assigned to a hierarchy level, there is no necessary relationship between link parent-child relationships and network hierarchy levels.

Figure 6:
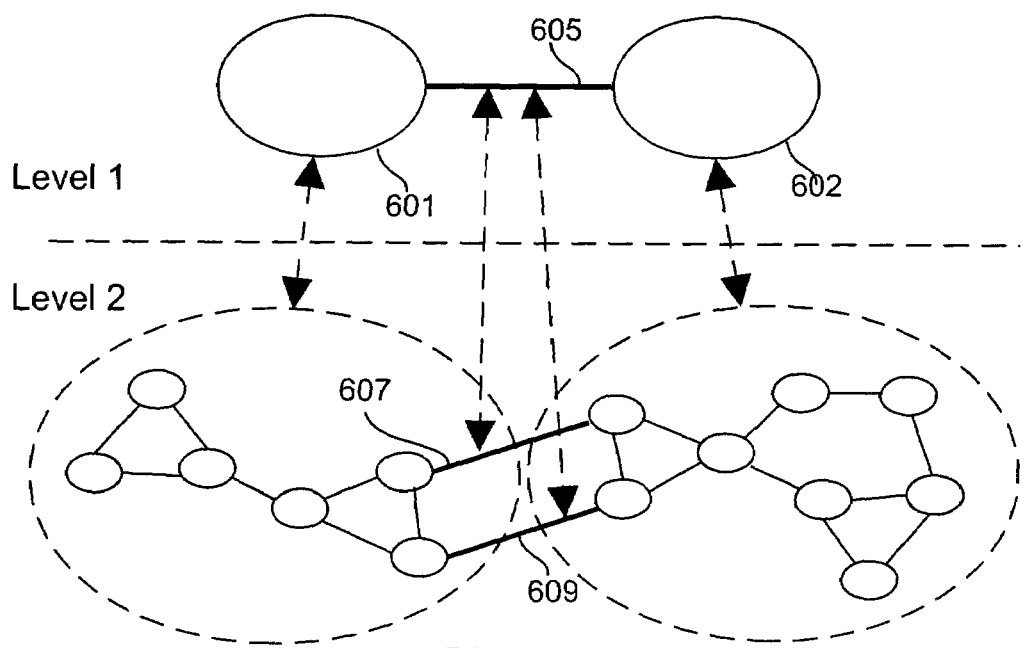
FIG. 6 shows a network organized in a hierarchy.

FIG. 6 shows a simple hierarchical network, in which there are two levels: Level 1 and Level 2. The top level (level 2) contains two nodes 601 and 602. Each node is the parent node of several nodes in the bottom level. The link 605 between the nodes in the top level is the parent link of two links 607 and 609 between nodes in the bottom level. The bottom level (level 1) shows the nodes that make up each node in the top level. It also shows the links between nodes that are child nodes of each parent node in the top level, and the two links 607 and 609 between nodes that have different parent nodes and are child links of the single link between the nodes in the top level in the hierarchy. (However, these two links in the bottom level could also be defined as not being child links of any parent link between nodes in a higher level.)

The parent-child relationships between each parent node and link and its child nodes and links are shown with dashed lines with arrowheads at both ends. Although not shown in FIG. 6, links can cross hierarchy levels. For example, a link could be defined between a node in the top level and any node in the bottom level. In this case, there would not be a parent-child relationship between the links.

Geometry Objects

Oracle Spatial, often be referred to simply as "Spatial," provides a SQL schema and functions that facilitate the storage, retrieval, update, and query of collections of spatial features in an Oracle9i database. The preferred network data modeling system utilizes the same geometry objects which are defined by Oracle Spatial, and thereby take advantage of the geometry processing capabilities of Oracle Spatial, including:

a schema (MDSYS) that prescribes the storage, syntax, and semantics of supported geometric data types;

a spatial indexing mechanism;

a set of operators and functions for performing area-of-interest queries, spatial join queries, and other spatial analysis operations and administrative utilities.

The spatial component of a spatial feature is the geometric representation of its shape in some coordinate space. This is referred to as its geometry.

Oracle Spatial supports the object-relational model for representing geometries. The object-relational model uses a table with a single column of MDSYS.SDO_GEOMETRY and a single row per geometry instance. In the network data model as described above, SDO_GEOMETRY objects may be located in the geometry column of node tables to specify the geometry of object(s) associated with a node, and in the geometry column of link tables to specify the geometry of object(s) associated with a link. The object-relational model corresponds to a "SQL with Geometry Types" implementation of spatial feature tables in the OpenGIS ODBC/SQL specification for geospatial features. See OpenGIS Simple Features Specification for SQL, Revision 1.1, OpenGIS Project Document 99-049 released May 5, 1999 (http://www.opengis.org).

Note that, in a spatial network data model implemented by the preferred embodiment, the nodes and links may be associated with SDO_GEOMETRY geometry objects without linear referencing system (LRS) information (an SDO network), or with linear referencing system (LRS) information (an LRS network), or SDO_TOPO_GEOMETRY objects (a topology geometry network).

The Linear Referencing System provides a natural and convenient means to associate attributes or events to locations or portions of a linear feature. It has been widely used in transportation applications (such as for highways, railroads, and transit routes) and utilities applications (such as for gas and oil pipelines). The major advantage of linear referencing is its capability of locating attributes and events along a linear feature with only one parameter (usually known as measure) instead of two (such as latitude/longitude or x/y in Cartesian space). Sections of a linear feature can be referenced and created dynamically by indicating the start and end locations along the feature without explicitly storing them. The linear referencing system (LRS) application programming interface (API) in Oracle Spatial provides server-side LRS capabilities at the cartographic level. The linear measure information is directly integrated into the Oracle Spatial geometry structure. The Oracle Spatial LRS API provides support for dynamic segmentation, and it serves as a groundwork for third-party or middle-tier application development virtually for any linear referencing methods and models in any coordinate systems. In an LRS network, each node includes a geometry ID value and a measure value, and each link includes a geometry ID value and start and end measure values; and the geometry ID value in each case refers to an SDO_GEOMETRY object with LRS information. A spatial network can be directed or undirected, depending on the application.

The benefits provided by the object-relational model as used in the network data model include: support for many geometry types, including arcs, circles, compound polygons, compound line strings, and optimized rectangles; ease of use in creating and maintaining indexes and in performing spatial queries; index maintenance by the database server; geometries modeled in a single row and single column of the node and link tables; and optimal performance. Other systems which are integrated with Oracle Spatial include those described in U.S. Pat. No. 6,594,666 issued to Biswas, et al. on Jul. 15, 2003 entitled "Location aware application development framework" and in U.S. Patent Application Publication No. 20020057283 by Biswas et al. published on May 16, 2002 entitled "Region modeling of mobile services."

A geometry is an ordered sequence of vertices that are connected by straight line segments or circular arcs. The semantics of the geometry are determined by its type. Oracle Spatial supports several primitive types and geometries composed of collections of these types, including two-dimensional: points and point clusters, line strings, n-point polygons; arc line strings (all arcs are generated as circular arcs), arc polygons, compound polygons, compound line strings, circles, and optimized rectangles.

Two-dimensional points are elements composed of two ordinates, X and Y, often corresponding to longitude and latitude. Line strings are composed of one or more pairs of points that define line segments. Polygons are composed of connected line strings that form a closed ring and the area of the polygon is implied. Self-crossing polygons are not supported, although self-crossing line strings are supported. If a line string crosses itself, it does not become a polygon. A self-crossing line string does not have any implied area.

The Oracle Spatial data model is a hierarchical structure consisting of elements, geometries, and layers, which correspond to representations of spatial data. Layers are composed of geometries, which in turn are made up of elements. For example, a point might represent a building location, a line string might represent a road or flight path, and a polygon might represent a state, city, zoning district, or city block.

An element is the basic building block of a geometry. The supported spatial element types are points, line strings, and polygons. For example, elements might model star constellations (point clusters), roads (line strings), and county boundaries (polygons). Each coordinate in an element is stored as an X,Y pair. The exterior ring and the interior ring of a polygon with holes are considered as two distinct elements that together make up a complex polygon. Point data consists of one coordinate. Line data consists of two coordinates representing a line segment of the element. Polygon data consists of coordinate pair values, one vertex pair for each line segment of the polygon. Coordinates are defined in order around the polygon (counterclockwise for an exterior polygon ring, clockwise for an interior polygon ring).

A geometry (or geometry object) is the representation of a spatial feature, modeled as an ordered set of primitive elements. A geometry can consist of a single element, which is an instance of one of the supported primitive types, or a homogeneous or heterogeneous collection of elements. A multipolygon, such as one used to represent a set of islands, is a homogeneous collection. A heterogeneous collection is one in which the elements are of different types, for example, a point and a polygon. An example of a geometry might describe the buildable land in a town. This could be represented as a polygon with holes where water or zoning prevents construction.

A layer is a collection of geometries having the same attribute set. For example, one layer in a GIS might include topographical features, while another describes population density, and a third describes the network of roads and bridges in the area (lines and points). Each layer's geometries and associated spatial index are stored in the database in standard tables.

Network Data Model Metadata Views

A network metadata view is created automatically by the system. If the user creates a network using one of the CREATE_<network-type>_NETWORK procedures provided by the PL/SQL API, the information in the metadata view is automatically updated to reflect the new network; otherwise, the user must insert information about the network into the USER_SDO_NETWORK_METADATA view. The columns of the metadata view are listed below:

| Column Name | Data Type | Purpose |
| --- | --- | --- |
| OWNER | VARCHAR2(32} | Owner of the network. ALL_SDO_NETWORK_METADATA view only.) |
| NETWORK | VARCHAR2(32) | Name of the network. |
| NETWORK_CATEGORY | VARCHAR2(12) | Contains SPATIAL if the network nodes and links are associated with spatial geometries; contains LOGICAL if the network nodes and links are not associated with spatial geometries. |
| GEOMETRY_TYPE | VARCHAR2(20) | If NETWORK_CATEGORY is SPATIAL, contains a value indicating the geometry type of nodes and links: SDO_GEOMETRY for non-LRS SDO_GEOMETRY objects, LRS_GEOMETRY for LRS_SDO_GEOMETRY objects, TOPO_GEOMETRY for SDO_TOPO_GEOMETRY objects. |
| NETWORK_TYPE | VARCHAR2(24) | User-defined string to identify the network type. |
| NO_OF_HIERARCHY_LEVELS | NUMBER | Number of levels in the network hierarchy. Contains 1 if there is no hierarchy. |
| NO_OF_PARTITIONS | NUMBER | Number of partitions. Must be 1 in current version. |
| LRS_TABLE_NAME | VARCHAR2(12) | If GEOMETRY_TYPE is SDO_GEOMETRY, contains the name of the table containing geometries associated with nodes. |
| LRS_GEOM_COLUMN | VARCHAR2(12) | If LRS_TABLE_NAME contains a table name, identifies the geometry column in that table. |
| NODE_TABLE_NAME | VARCHAR2(32) | If GEOMETRY_TYPE is SDO_GEOMETRY, contains the name of the table containing geometries associated with nodes. |
| NODE_GEOM_COLUMN | VARCHAR2(32) | If NODE_TABLE_NAME contains a table name, identifies the geometry column in that table. |
| NODE_COST_COLUMN | VARCHAR2(32) | If NODE_TABLE_NAME contains a table name, identifies the cost column in that table. |
| LINK_TABLE_NAME | VARCHAR2(32) | If GEOMETRY_TYPE is SDO_GEOMETRY, contains the name of the table containing geometries associated with links. |
| LINK_GEOM_COLUMN | VARCHAR2(32) | If LINK_TABLE_NAME contains a table name, identifies the geometry column in that table. |
| LINK_DIRECTION | VARCHAR2(12) | Contains a value indicating the type for all links in the network: UNDIRECTED or DIRECTED. |
| LINK_COST_COLUMN | VARCHAR2(32) | If LINK_TABLE_NAME contains a table name, identifies the optional numeric column containing a cost value for each link. |
| PATH_TABLE_NAME | VARCHAR2(32) | Contains the name of an optional table containing information about paths. |
| PATH_GEOM_COLUMN | VARCHAR2(32) | If PATH_TABLE_NAME is associated with a spatial network, identifies the geometry column in that table. |
| PATH_LINK_TABLE_NAME | VARCHAR2(32) | Contains the name of an optional table containing information about links for each path. |
| PARTITION_TABLE_NAME | VARCHAR2(32) | (Reserved for future use.) |

Network Data Model Application Programming Interface

The network data model includes two client application programming interfaces (APIs): a PL/SQL interface and a Java interface. Both interfaces let the user create and update network data, and the Java interface provides network analysis capabilities. The user normally employs only PL/SQL or SQL to populate network tables and to create indexes, and then uses the Java interface for application development.

Figure 7:
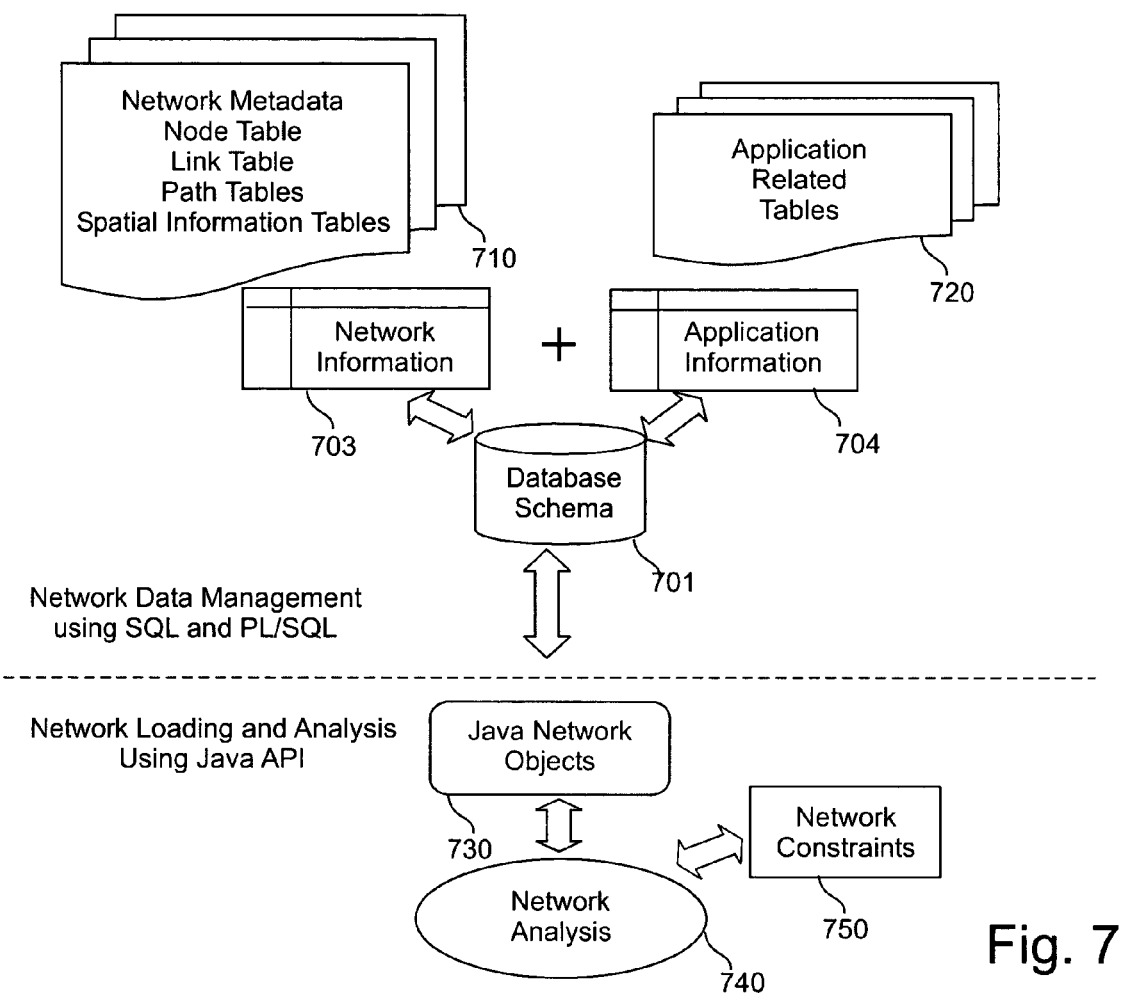
FIG. 7 depicts the overall architecture of the network data model.

FIG. 7 shows the architecture of the network data model. Data structures are defined by a database schema seen at 701 which separately defines network (connectivity) information at 703 and application information at 704. The network information in contained in tables 710 which include the node table, the link table, path tables, network metadata and spatial information tables. The application information is stored in the RDBMS in separate, user created application related tables as seen at 720.

Application programs may store and manipulate both the network information 703 and the application information 704 using one of two interfaces.

The Network Data Model PL/SQL Interface. PL/SQL is a procedural language superset of the structured query language (SQL). As implemented in the Oracle10$^g$ RDBMS, SQL/PL may be used to codify business rules through the creation of stored procedures and packages, to trigger database events to occur, or to add programming logic to the execution of SQL commands. The network data model PL/SQL API provides functions and procedures for creating, accessing, and managing networks on a database server. These functions and procedures can be grouped into the following logical categories: (a) creating networks; (b) copying and deleting networks: (c) creating network tables; (d) validating network objects; and (e) retrieving information (getting information about the network, checking for a characteristic.

The Network Data Model Java API provides Java Network Objects seen at 730 which can be used to perform network analysis as indicated at 740. The network constraint mechanism seen at 750 enables application-related constraints to guide network analysis without knowing the application context.

Figure 8:
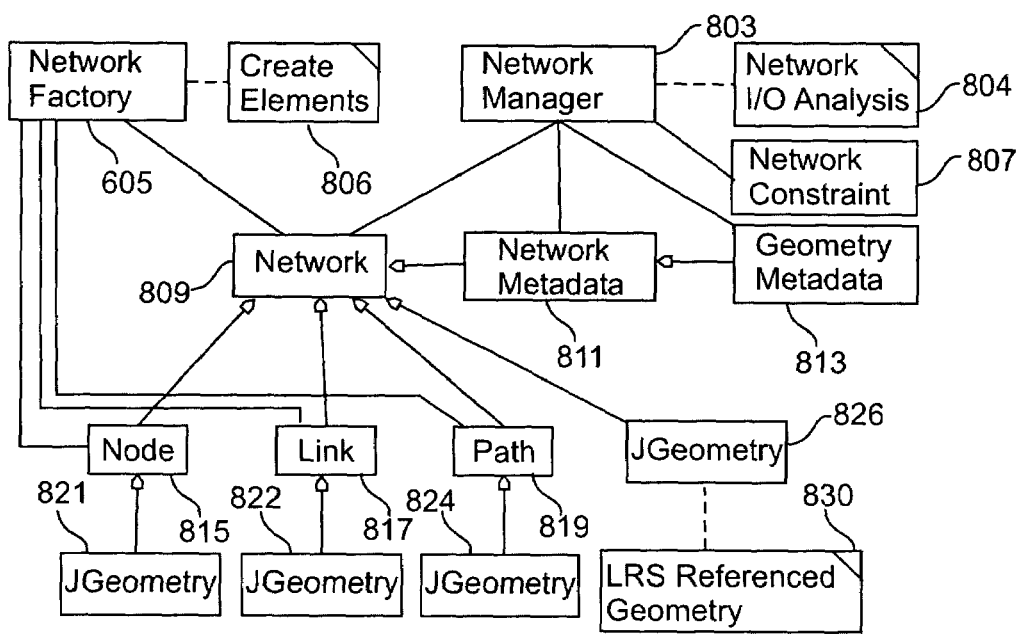
FIG. 8 is a Unified Modeling Language (UML) diagram that shows the relationship between the main classes and interfaces provided by the Java API of the network data model.

The Network Data Model Java Interface. FIG. 8 is a Unified Modeling Language (UML) diagram that shows the relationship between the main classes and interfaces provided by the Java network data model API. The Java client interface for the network data model consists of the following classes and interfaces:

(a) a NetworkManager class seen at 803 for loading and storing network data and metadata, and to perform network analysis;

(b) a NetworkFactory class seen at 805 for creating elements related to the network;

(c) a NetworkConstraint class seen at 807 for creating network constraints;

(d) a Network interface seen at 809 for a network;

(e) a NetworkMetadata interface at 811 for network metadata;

(f) a GeometryMetadata class at 813 for geometry metadata;

(g) a Node interface at 815 for a network node;

(h) a Link interface at 817 for a network link;

(i) a Path interface at 819 for a network path;

(j) a MDPoint interface (not shown in FIG. 8) for a multiple-dimension point;

(k) a MBR interface (not shown in FIG. 8) for a multiple-dimension minimum bounding rectangle;

(l) a JGeometry class for Java access to SDO_GEOMETRY data (seen at 821, 822, 824, and 826); and (m) a NetworkDataException class (not shown in FIG. 8) for exceptions.

The user can use the Java API to perform network metadata and data management operations such as the following: insert, delete, and modify node and link data; load a network from a database; store a network in a database; store network metadata in a database; and modify network metadata attributes.

The user can also use the Java API to perform network analysis operations such as the following:

find the shortest path (for directed and undirected networks);

solve typical transitive closure problems in graph theory;

given a start and an end node, find the shortest path;

find the minimum cost spanning tree (for undirected networks);

find the minimum cost tree that connects all nodes;

given a node, find all nodes that can reach that node, or find all nodes that can be reached by that node;

given a target node and a cost, find all nodes that can be reached by the target node within the given cost;

given a target node and number of neighbors, find the neighbor nodes and their costs to go to the given target node;

find all possible paths between two nodes; and/or solve the "traveling salesman problem:" given a set of nodes, find the lowest-cost path that visits all nodes and in which the start and end nodes are the same.

Network Creation Using the Java API As an alternative to using PL/SQL and SQL, the network data model Java API can be used to create a network. To create a Java network, the user creates an empty network object with network metadata, and then adds nodes, links, and optionally paths. Once the Java network object is created, the user can perform network analysis on it, and can store the Java network object in the database. The following example Java code excerpt creates a network, performs some analysis, and stores the network in the database.:

```
// create an empty logical network
Network logicalNetwork = NetworkFactory.createLogicalNetwork(
"LOGICAL_NET",
1, // no of hierarchy levels
true // directed link?
);
// create nodes and add them to the network
logicalNetwork.addNode(NetworkFactory.createLogicalNode(
1, // node ID
"N1" // Node Name );
logicalNetwork.addNode(
NetworkFactory.createLogicalNode(
2, // node ID
"N2" // Node Name );
...
// create links and add them to the network
logicalNetwork.addLink(
NetworkFactory.createLogicalLink(
1, // link ID
"L1", // link name
logicalNetwork.getNode(1),
logicalNetwork.getNode(2), ...
// find the shortest path
Path path = logicalNetwork.shortestPath(logicalNetwork,1,2);
path.setID(1);
// set Path ID
//add the path to network
logicalNetwork.addPath(path);
// save the network to database
NetworkManager.writeNetwork(con,logicalNetwork);
```

CONCLUSION

It is to be understood that the methods and apparatus which have been described above are merely illustrative applications of the principles of the invention. Numerous modifications may be made by those skilled in the are without departing from the true spirit and scope of the invention.

What is claimed is:

1. A relational database management system comprising computer readable storage media for storing instructions executable by a processor for storing and analyzing network data stored in relational tables that describe a set of nodes and links forming a network wherein each of said nodes represents an object of interest and each of said links represents a relationship between two of said nodes, said computer readable storage media storing:

a generic node table containing a plurality of node table rows each of which contains data describing a given node in said set of nodes, a generic link table containing a plurality of link table rows each of which contains data describing a link between two nodes in said set of nodes and further identifying the two node table rows in said generic node table that contain data describing each of said two nodes, and wherein said instructions executable by a processor implement an application program interface which enables external executing application programs to create said generic node table and said generic link table, to store data describing nodes in said generic node table, to store data describing links between said nodes in said generic link table, and to perform a plurality of standard operations on the data in said generic node table and said generic link table.

2. The relational database management system as set forth in claim 1 wherein said network is a logical network.

3. The relational database management system as set forth in claim 1 wherein each of said node table rows contains data specifying a node cost attribute associated with said given node and wherein each of said link table rows further contains a link cost attribute associated with a link.

4. The relational database management system as set forth in claim 3 wherein said standard operations include at least one path identification procedure for analyzing the said network data to identify a particular path having one or more stated cost characteristics.

5. The relational database management system as set forth in claim 3 wherein said standard operations include at least minimum cost path identification procedure for analyzing the said network data to identify the path that has the minimum total cost from a stated start node to a stated end node.

6. The relational database management system as set forth in claim 1 wherein said standard operations include analyzing said network data to identify a path consisting of an alternating sequence of nodes and links having defined characteristics.

7. The relational database management system as set forth in claim 1 wherein said system further includes a path table containing a plurality of path table rows each of which contains data describing a path consisting of an alternating sequence of nodes and links.

8. The relational database management system as set forth in claim 7 wherein said standard operations include at least one path identification procedure for analyzing said network data to identify a particular path having stated characteristics and for placing information describing said particular path in one of said path table rows.

9. The relational database management system as set forth in claim 7 wherein said system further includes a path-link table containing one ordered set of path-link table rows associated with each given path described in said path table, each of said path-link table rows containing information identifying one link in the sequence of links in said given path.

10. The relational database management system in claim 9 wherein said standard operations include at least one path identification procedure for analyzing said network data to identify a particular path having stated characteristics and for placing information describing said particular path in one of said path table rows and for placing information describing the sequence of links in said particular path in said path-link table.

11. The relational database management system as set forth in claim 1 wherein said standard operations include loading node and link data into said generic node table and said generic link table respectively from a database.

12. The relational database management system as set forth in claim 1 wherein said network is a spatial network and wherein each of said node table rows includes a column for storing the identification of a geometry object which specifies an ordered sequence of vertices that are connected by straight line segments or circular arcs that define the shape and location of one of said nodes.

13. The relational database management system as set forth in claim 12 wherein each of said link table rows includes a column for storing the identification of a geometry object which specifies an ordered sequence of vertices that are connected by straight line segments or circular arcs that define the geometry of one of said links.

14. The relational database management system as set forth in claim 1 wherein each of said link table rows includes a column for storing the identification of a geometry object which specifies an ordered sequence of vertices that are connected by straight line segments or circular arcs that define the shape and location of one of said links.

15. The relational database management system as set forth in claim 1 wherein each of said node table rows further contains a level column for holding a hierarchy level.

16. The relational database management system as set forth in claim 15 wherein each of said node table rows further contains a parent column for holding the identification of a parent node within the hierarchy established by said level column.

* * * * *

UNITED STATES PATENT AND TRADEMARK OFFICE
CERTIFICATE OF CORRECTION

PATENT NO. : 7,454,428 B2
APPLICATION NO. : 10/696482
DATED : November 18, 2008
INVENTOR(S) : Wang et al.

It is certified that error appears in the above-identified patent and that said Letters Patent is hereby corrected as shown below:

In column 7, line 21, delete "NET 1," and insert -- NET1, --, therefor.

In column 7, line 22, delete "LINK $," and insert -- LINK$, --, therefor.

In column 8, line 3, delete "inode$" and insert -- node$ --, therefor.

In column 8, line 13, delete "NET_" and insert -- NET1_ --, therefor.

In column 8, line 25, delete "populated," and insert -- populated. --, therefor.

In column 9, line 23, delete "had" and insert -- has --, therefor.

In column 15, in table, line 2, delete "(32}" and insert -- (32) --, therefor.

In column 15, in table, line 4, delete "only.)" and insert -- only. --, therefor.

In column 17, lines 33–34, delete "(getting" and insert -- getting --, therefor.

Signed and Sealed this

Twentieth Day of April, 2010

David J. Kappos
*Director of the United States Patent and Trademark Office*